3,776,871
COLD HARDENING POLYMERIZABLE
COMPOSITION
Erich Bader, Hanau am Main, and Hubert Koert and Gerd Brod, Grossauheim, Germany, assignors to Deutsche Gold- und Silber-Scheideanstalt vormals Roessler, Frankfurt am Main, Germany
No Drawing. Continuation-in-part of abandoned application Ser. No. 71,372, Sept. 11, 1970, which is a division of application Ser. No. 692,248, Dec. 20, 1967, now Patent No. 3,551,372, which in turn is a continuation of abandoned application Ser. No. 404,511, Oct. 16, 1964. This application June 6, 1972, Ser. No. 260,144
Claims priority, application Germany, Dec. 12, 1963, D 43,156
Int. Cl. C08f 19/00
U.S. Cl. 260—28.5 D        5 Claims

ABSTRACT OF THE DISCLOSURE

A polymerizable composition useful for coating, filling, sealing and waterproofing various substrates, which consists essentially, (A) in an amount of about 50 to 95% by weight of said composition, of polymerizable monomer compounds and said monomer compounds in turn consisting,
  (i) to an extent of about 1 to 50% by weight of the total monomers, of at least one compound selected from the group consisting of n-hexyl acrylate, n-octyl acrylate, 2-ethylhexyl acrylate, decyl acrylate and the corresponding methacrylic acid esters,
  (ii) the remainder of said polymerizable monomer compounds being methylmethacrylate,
(B) in an amount of about 5 to 50% by weight of said composition, of polymeric compounds and said polymeric compounds in turn consisting of
  (i) at least one interpolymer of vinyl chloride and at least one other monomer selected from the group consisting of vinyl acetate, maleic acid, maleic acid esters and maleic acid anhydride, said interpolymer of vinyl chloride being soluble in said monomer compounds at (A), and
  (ii) any remainder of said polymeric compounds consisting of at least one polymer of said monomer compounds at (A) which is soluble in said latter monomer compounds, and
(C) of sufficient quantities of catalyst to effect the polymerization of said monomer compounds at (A) so as to cause the cold hardening of said composition.

CROSS-REFERENCES TO RELATED APPLICATIONS

The present application is a continuation-in-part of application Ser. No. 71,372, now abandoned, filed on Sept. 11, 1970 by the same inventors in respect of the same subject matter. Application Ser. No. 71,372 was a division of application Ser. No. 692,248, now Pat. 3,551,372, filed Dec. 20, 1967 by the same inventors in respect of "Composition and Process for Covering, Coating and Filling Cavities or Depressions," which latter application in turn was a continuation of application Ser. No. 404,511, filed on Oct. 16, 1964, now abandoned.

BACKGROUND OF THE INVENTION

This invention relates to reaction masses based on a polymerizable mixture consisting essentially of monomeric methyl methacrylate, specific monomeric acrylic or methacrylic acid ester whose alcohol component has more than 4 carbon atoms, and a copolymer or interpolymer of vinyl chloride and/or a mixture of polymers of the above monomers and their use for covering, coating, sealing and filling depressions, holes, seams and cavities in substrates.

It is known that streets and various substrates made of concrete, bitumen, asphalt and the like can be coated or covered with a plastic or resin mass for protection against frost damage, salt erosion, abrasion or for providing markings, liberating dust or carrying out repairs. These masses can also be used for waterproofing swimming pools, silos, quenching tanks, dams and the like. Likewise they are useful for producing resistant coatings on horizontal or vertical concrete surfaces, for instance, on balconies, terraces, patios, industrial rooms or halls, warehouses, cellars or basements, concrete bridges, as well as on walls or surfaces of other construction materials, such as brick, plates, concrete or cinder block and the like. Moreover, these masses are suitable for spreading or brushing onto iron or steel for protection against corrosion. Examples for this are coatings on bridges, industrial halls or rooms, railroad cars, piping, dock construction, ship structures and walls, boilers and other containers.

The plastic or resin masses known heretofore for these purposes consist of systems which harden or cure at lower temperatures and in addition to unsaturated polyester or epoxide resins contain the corresponding hardeners in admixture. They often have the disadvantage that they cannot be cured or hardened at temperatures below 10° C. or do only incompletely cure. The result is defective adhesion to the substrate. They are moreover on the whole not applicable at temperatures below freezing. In many cases the fully hardened mass does not have the desired elasticity and weather resistance.

It is also known to use an agent consisting of a mixture of hydraulically bound structural materials containing sand, gravel, chips and the like or consisting of natural stone, which are added to a mixture of monomeric and polymeric methyl methacrylate, a hardener, and an inorganic filler. A viscosity lowering agent can also be added to this mixture.

It is therefore an object of the invention to provide for a cold-hardening or self-curing composition for coating, covering or sealing a substrate, particularly substrates formed by a mixture of hydraulically bound construction materials containing sand, gravel, chips and the like or natural stone. It should also be useful for substrates of metals, such as copper, zinc, aluminum and particularly iron, steel or their alloys. One of the main objects of the invention is a composition for filling depressions, cracks and joints in or between the mentioned materials.

SUMMARY OF THE INVENTION

In its broad aspects the composition of the invention is a mixture of monomeric polymerizable organic compounds, of polymers, of polymerization catalysts and, of necessary, of a filler.

More specifically the composition essentially consists of a cold hardening composition for coating, filling, sealing and waterproofing lithic, metal, asphalt or bituminous substrates essentially consisting, (A) in an amount of about 50 to 95% by weight of said composition, of polymerizable monomer compounds and said monomer compounds in turn consisting,
  (i) to an extent of about 1 to 50% by weight of the total monomers, of at least one compound selected from the group consisting of n-hexyl acrylate, n-octyl acrylate, 2-ethylhexyl acrylate, decyl acrylate and the corresponding methacrylic acid esters,
  (ii) the remainder of said polymerizable monomer compounds being methylmethacrylate,
(B) in an amount of about 5 to 50% by weight of said composition, of polymeric compounds and said polymeric compounds in turn consisting of (i) at least one interpolymer of vinyl chloride and at least one other monomer selected from the group consisting of vinyl acetate, maleic acid, maleic acid esters and maleic acid anhydride, said interpolymer of vinyl chloride being soluble in said monomer compounds at (A), and (ii) any remainder of said polymeric compounds consisting of at least one polymer of said monomer compounds at (A) which is soluble in said latter monomer compounds, and (C) of sufficient quantities of catalyst to effect the polymerization of said monomer compounds at (A) so as to cause the cold hardening of said composition.

These mixtures can contain, in addition, known plasticizers, especially polymer plasticizers, and/or solvents, stabilizers, fillers, pigments and other known additives.

DESCRIPTION OF THE PREFERRED EMBODIMENTS

The compositions of the invention are distinguished, for example, from other similar methyl methacrylate polymer-monomer compositions, by their increased impact toughness and particularly good adhesion to the substrate even under the influence of water and aqueous solutions. In addition, they have a very smooth upper surface upon curing, have low susceptibility for dirt and are cleaned easily and well. They are universally dyeable or colorable and on this basis can be used especially for markings.

The compositions, as indicated, consist, to an extent of about 50 to 95% of the total, of polymerizable monomers and, to about 5 to 50% of the total, of polymeric compounds.

The monomeric portion of the composition is constituted as follows:

1 to 50% of the monomers are long chain esters of acrylic acid or methacrylic acid. The remainder of the monomers is methyl methacrylate. The long chain esters which can be used are for instance, n-hexyl acrylate, n-octyl acrylate, 2-ethylhexyl acrylate, decyl acrylate, and the corresponding methacrylates. These esters whose alcohol components have 6 to 10 carbon atoms are preferred, since they cause an optimum elasticizing effect in polymerization activity upon the total mixing, and cause lower volatility and less take up of water by the polymers.

The polymeric portion of the compositions is composed of interpolymers of vinyl chloride and certain other monomers above identified. Any balance of the polymer portion is made up by polymers of the forementioned monomers.

It is possible to use the polymers of the given monomers as homopolymers, copolymers or interpolymers.

In place of solutions of the polymers in the monomers, syrups can be used as the starting material which contain the polymerizable material in the form of a prepolymer obtained by partial polymerization.

The copolymers of vinyl chloride can be added as suspension or emulsion copolymers, however. The vinyl chloride should make up at least 50% of the total amount of the copolymer. Their K value desirably lies between 30 and 80. In many cases it is advantageous if a copolymer having, for example, a small vinyl acetate content is mixed with undiluted or pure polyvinyl acetate. Moreover, maleic acid and its esters as well as maleic acid anhydride, for example, can also be components in the copolymer. These components desirably comprise less than 30% of the total polymers. In addition, it is also possible to mix copolymers, for example, copolymers of vinyl chloride and vinyl acetate, with other copolymers, for example, copolymers of vinyl chloride and maleic acid esters. In the above cases a further addition of polyvinyl acetate is also possible.

The above polymers, copolymers, or polymer mixtures are dissolved in the monomers such that the resulting solution consists of a fluid having the consistency of a syrup. A good workable consistency is achieved by selecting or controlling the degree of polymerization and the amount of polymers in solution. This consistency is suitable between about 200 and about 20,000 cps. and the amount of polymers comprises between about 5 and about 50% by weight of the total mixture.

In order to achieve the desired consistency a small amount of solvent, for example, an ester such as butyl acetate, a glycol ether, a ketone such as methyl ethyl ketone or acetone, an aromatic hydrocarbon, such as benzene or xylene, or a chlorinated hydrocarbon, such as a chlorobenzene or perchloroethylene, can be added to the mixture. In such cases the amount of solvent comprises up to about 20% by weight of the total mixture. Compatible aliphatic hydrocarbons and alcohols can also be added. Especially good adhesion which does not subside after long aging can be achieved through the presence of these solvents in the cured mass or coating.

It is desirable to add small amounts of soluble paraffins and/or types of waxes in a known manner to the mixture to resist air inhibition.

Moreover, it is advantageous to add small amounts of free acrylic or methacrylic acid, preferably in amounts of about 0.01 to about 5% by weight calculated on the monomer component, in order to improve adhesion. Suitable plasticizers, which can be added to the agents beforehand, are phthalates such as dibutyl phthalate, propyl phthalate and dioctyl phthalate, adipates such as dibutyl adipate and dioctyl adipate, sebacates such as dibutyl sebacate and propyl sebacate, chlorinated di-, tri- and polyphenyl, chlorinated paraffins and drying oils which can also be partially epoxidized. The preferred polymeric plasticizers are esters from polybasic acids and multibasic alcohols such as polyadipates and polysebacates derived from adipic and sebacic acid and ethylene glycol, butylene glycol, propylene glycol, etc.

Catalysts can be used for hardening or curing the mixture according to the invention as are known for vinyl polymerizations. Preferably such catalysts are selected which effect curing or hardening in the temperature range of about −30 to about +50° C. within a short time, that is within a time of about 12 hours. Such catalyst systems are also preferred which comprise at least one tertiary amine as well as, if necessary, other known accelerators and/or promoters and/or cocatalysts. The preferred tertiary amines are those whose nitrogen atom is connected directly with at least one aromatic group such as dimethyl-p-toluidine. The preferred peroxides are acyl peroxides such as benzoyl peroxide, lauroyl peroxide and 2,4-dichlorobenzoyl peroxide. Examples of other constituents which are suitable for such known catalyst systems are organic sulfur compounds, especially mercaptans, besides α-oxysulfones and heavy metal compounds. The mixtures can also contain known inhibitors, such as hydroquinone, and stabilizers, which produce sufficient weather resistance for the polyvinyl chloride components. Examples of such stabilizers include metal compounds, especially fatty acid salts of barium, cadmium, zinc and calcium. Organic tin compounds, known as polyvinyl chloride stabilizers, can also be added for the same purpose. Known ultraviolet stabilizers can also be added to the mixtures, for example, derivatives of benzophenones or benzotriazols. A preferred type of stabilizers are the organic esters of the phosphorus acid, like triphenyl phosphite.

Fillers within the scope of the invention comprise sand, powdered stone, powdered asbestos, carborundum, gypsum, chalk, zinc oxide, sawdust, barium sulfate and insoluble, granulated or pulverized plastic and resin masses. Preferably such fillers are employed which are thixotropic, especially pyrogenically produced silicic acid, i.e., "Aerosil." All color fast dyes or coloring materials which are useful for coloring acrylic plastic and resin materials can be used as pigments for the masses of the invention. It is only necessary to see that these known additives and supplemental components do not adversely affect the polymerization.

The ranges of amounts of each of the above additives, fillers and supplemental components to be used in the mixture according to the invention will be determined by the end use of the mixture. In general the amounts employed in acrylic and polyvinyl chloride resins and plastics heretofore are suitable for the masses of this invention.

If all of the constituents of the mixture, especially the complete catalyst system, are mixed, the resulting mass is designed to be used immediately. However, it is also possible to produce the mass in a storable condition in which the mixture is divided into two parts, one part containing the catalyst system and the other part containing the other components. For example, a polymerization accelerator may be added to one part and the catalyst or hardener to the other. Before use both parts are mixed together and then applied to the substrate, either batchwise by hand or continuously, for example, with the aid of a two-component spray gun.

In use it is advantageous to apply the coating comprising the agent according to the invention in two or more different layers. The first layer is especially adherent and seals or fills the pores of the substrate. The other layer or layers provide special abrasion, impact and weather resistance. The first layer may suitably comprise a mixture of about 30 to about 80% by weight of a monomeric polymerizable organic substance like methyl methacrylate and about 20 to about 50% by weight of a polymerized organic substance dissolved in said monomeric substance, for example, polymethyl methacrylate, or resp. in addition about 5 to about 70% by weight of a chlorinated terphenyl or diphenyl. Preferably the polymethyl methacrylate is used in the form of a prepolymer obtained by partial polymerization.

The second layer may comprise a mixture as described before.

In using the agent according to the invention upon surfaces which, for example, contain air inclusions due to their porosity it is advantageous to apply a primer before applying the agent. The same also applies to such substrates which can be dissolved by the agent or in which the agent can dissolve. Known primers can be used for this purpose, however, preferably they should consist of a polymerizable mixture which contains a monomeric polymerizable substance and a polymer, e.g., a reaction lacquer. This mixture should cure or harden quickly, for example, by using a so-called redox catalyst which consists, for instance, of a peroxidic compound and a tertiary amine. The consistency of the mixture should be controlled or determined such that they contain a high amount of polymer component and at the same time have as low a viscosity as possible. Moreover, they should display good wetting properties and not be too insoluble. On the other hand, they should enable the formation of a good bond with the coating mass.

If iron or steel is to be coated, an adhesive base known per se or a so-called wash-primer can serve as the first layer. However, the mass according to the invention can be used in a composition which contains a corrosion inhibiting additive such as powdered zinc, zinc chromate, red lead and the like. The surface of the iron can also be phosphatized or rendered passive in a known manner.

Sand, gravel, chips or the like can be sprinkled or strewn over the coating after application and while it is still fluid or soft in order to give the coated substrate a rough upper surface. The sprinkled or strewn material is bound, fixed or imbedded firmly in the plastic or resin mass while it hardens without compressing or rolling the surface.

The composition and process of the invention are further set out by way of illustration in the following examples. The parts and percentages employed in the examples, specification and claims are by weight unless otherwise specified.

Example 1

25 parts of a copolymer having a K value of 55 prepared from 26 parts of vinyl chloride and 40 parts of vinyl acetate were dissolved in 45 parts of monomeric methyl methacrylate
30 parts of n-hexyl acrylate
0.3 parts of dimethyl-p-toluidine
0.2 parts of lauryl mercaptan
0.3 parts of paraffin having a melting point of 52–54° C.

50 parts of this solution were mixed with 50 parts of ground shale. Shortly before use the mass was mixed with one part of hardener paste consisting of 50% benzoyl peroxide in dioctyl phthalate. A dry concrete surface was first painted or primed with a mixture consisting of 50 parts monomeric methyl methacrylate, 10 parts glycol dimethacrylate and 20 parts polymeric methyl methacrylate having a K value of 50, 3 parts dimethyl aniline and 3 parts p-chlorobenzoyl peroxide. This layer completely hardened in about 15 minutes. Then the above mixture according to the invention was applied to the first layer and provide a smooth, resistant covering or coating. Curing or hardening was complete at 20° C. in about 2 hours.

Example 2

5 parts of a copolymer produced from 80 parts vinyl chloride and 20 parts maleic acid ethyl ester having a K value of 60 was dissolved in a mixture of 5 parts of methyl ethyl ketone
5 parts of xylene
5 parts of polyadipate from adipic acid and butylene glycol.

Into the resulting solution was stirred 20 parts of ethylhexyl acrylate
0.5 parts of dimethyl-p-toluidine
0.1 parts of lauryl mercaptan
0.3 parts of paraffin melting at 52–54° C.

This solution was combined with 65 parts of a methyl methacrylate composition containing about 30% polymeric methyl methacrylate and the remainder monomeric methyl methacrylate. 100 parts of powdered quartz and 2 parts of the benzoyl peroxide paste of Example 1 were then added and the resulting mass had a pot life of 20 minutes. The mass was brushed onto a steel container which was freshly sand blasted and after one hour was hardened and provided a firmly adhering corrosion resistant coating.

Example 3

15 parts of chlorinated terphenyl (60% chlorine content)
15 parts of a copolymer having a K value of 50 prepared from 60 parts of vinyl chloride and 40 parts of vinyl acetate and
10 parts of polymethyl methacrylate having a K value of 25 were dissolved in 40 parts of monomeric methyl methacrylate and
10 parts of monomeric 2-ethylhexylacrylate.

To this solution 0.3 part of dimethyl-p-toluidine
1.0 part of triphenylphosphite
0.5 part of paraffin having a melting point of 48–52° C.
8.2 parts polysebacate, prepared from sebacic acid and ethylene glycol were added.

40 parts of this solution were mixed with 30 parts of quartz sand, 20 parts of powdered quartz and 10 parts of corundum. Shortly before use the mass was mixed with one part of a hardener paste consisting of 50% benzoyl peroxide in dibutyl phthalate. The pot life was 13 minutes and the hardening time 25 minutes at 20° C.

In addition the mixtures of this invention also may contain at least one chlorinated diphenyl or terphenyl. The amount of these substances should make up to about 35% by weight and preferably between about 5 and about 35% by weight of the total mixture. The chlorine content of these substances generally lies between about 40 and about 70%.

Without further analyis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A cold hardening composition for coating, filling, sealing and waterproofing lithic, metal, asphalt or bituminous substrates essentially consisting,
   (A) in an amount of about 50 to 95% by weight of said composition, of polymerizable monomer compounds and said monomer compounds in turn consisting,
      (i) to an extent of about 1 to 50% by weight of the total monomers, of at least one compound selected from the group consisting of n-hexyl acrylate, n-octyl acrylate, 2-ethylhexyl acrylate, decyl acrylate and the corresponding methacrylic acid esters,
      (ii) the remainder of said polymerizable monomer compounds being methylmethacrylate,
   (B) in an amount of about 5 to 50% by weight of said composition, of polymeric compounds and said polymeric compounds in turn consisting of
      (i) at least one interpolymer of vinyl chloride and at least one other monomer selected from the group consisting of vinyl acetate, maleic acid, maleic acid esters and maleic acid anhydride, said interpolymer of vinyl chloride being soluble in said monomer compounds at (A), and
      (ii) any remainder of said polymeric compounds consisting of at least one polymer of said monomer compounds at (A) which is soluble in said latter monomer compounds, and
   (C) of sufficient quantities of catalyst to effect the polymerization of said monomer compounds at (A) so as to cause the cold hardening of said composition.

2. The composition of claim 1, which includes a minor proportion of a paraffin.

3. The composition of claim 1, which includes a metal corrosion inhibitor.

4. The composition of claim 1, which includes a chlorinated terphenyl or diphenyl.

5. The composition of claim 1, which includes an organic ester of phosphorous acid as a stabilizer.

No references cited.

ALLAN LIEBERMAN, Primary Examiner
P. R. MICHL, Assistant Examiner

U.S. Cl. X.R.

260—33.8 UA, 884